(No Model.) 4 Sheets—Sheet 1.
E. E. HENDRICK.
MACHINE FOR THE MANUFACTURE OF ICE AND FOR REFRIGERATING PURPOSES.

No. 336,233. Patented Feb. 16, 1886.

Fig. 1.

WITNESSES:
G. N. Abbey.
Geo. H. Sonneborn.

INVENTOR:
E. E. Hendrick
W. G. Button
his atty (No Model.) 4 Sheets—Sheet 2.

E. E. HENDRICK.
MACHINE FOR THE MANUFACTURE OF ICE AND FOR REFRIGERATING PURPOSES.

No. 336,233. Patented Feb. 16, 1886.

WITNESSES,
G. N. Abbey.
Geo. H. Sonneborn.

INVENTOR,
E. E. Hendrick,
by his Att'y
Wm. G. Button

N. PETERS, Photo-Lithographer, Washington, D. C.

(No Model.)  
4 Sheets—Sheet 3.

E. E. HENDRICK.
MACHINE FOR THE MANUFACTURE OF ICE AND FOR REFRIGERATING PURPOSES.

No. 336,233. Patented Feb. 16, 1886.

Witnesses,  
G. N. Abbey.  
Geo. H. Sonneborn.

Inventor,  
E. E. Hendrick,  
by his Atty  
Wm. G. Button (No Model.) 4 Sheets—Sheet 4.

E. E. HENDRICK.
MACHINE FOR THE MANUFACTURE OF ICE AND FOR REFRIGERATING PURPOSES.

No. 336,233. Patented Feb. 16, 1886.

WITNESSES,
G. H. Abbey.
Geo. H. Sonneborn.

INVENTOR,
E. E. Hendrick,
by his Atty.
Wm. G. Button

UNITED STATES PATENT OFFICE.

ELI E. HENDRICK, OF CARBONDALE, PENNSYLVANIA.

MACHINE FOR THE MANUFACTURE OF ICE AND FOR REFRIGERATING PURPOSES.

SPECIFICATION forming part of Letters Patent No. 336,233, dated February 16, 1886.

Application filed October 23, 1885. Serial No. 180,758. (No model.)

*To all whom it may concern:*

Be it known that I, ELI E. HENDRICK, of Carbondale, Lackawanna county, State of Pennsylvania, have invented certain new and useful Improvements in Machines for the Manufacture of Ice and for Refrigerating Purposes, of which the following is a full, clear, and exact specification, reference being had to the accompanying drawings.

My invention consists of a refrigerating apparatus constructed and arranged to work by the evaporation and absorption process, and is more particularly adapted to the use of aqua-ammonia as the cooling agent.

The object of my invention is to obtain the required refrigeration with less expenditure of fuel and more advantageously than it has been obtained by previous machines. I effect this desirable result by the use of exhaust-steam as an evaporating agent and by the employment of several improvements in the construction of the apparatus.

The advantages of using exhaust-steam are the saving effected by the utilization of a waste product, the avoidance of all danger of overheating and frothing of the ammonia in the still, and less useless evaporation of water.

My improvement in the still consists in placing in the still a number of independent coils of pipe, each connected at one end with a manifold for supplying steam, and at the other end with a manifold forming a steam and water escape pipe. These coils are each independent, and the pipes connecting them with the manifolds or steam-conducting pipes have valves, so that any coil or coils can be shut off, when required by leakage, accident, or otherwise, without in the least interfering with the proper working of the remainder.

The improvement in the coils themselves, which I also use in the absorber to circulate cold water, consists in constructing them of one piece of pipe without screw or other joints. To prevent leakage the end of the pipes forming the coil pass through lead packing in stuffing-boxes in the shell of the still. This construction of the coils avoids all danger of leakage within the still, for the coils are absolutely without joints.

In the lower part of the still I connect, by means of suitably-valved pipes, a portion of the coils to other steam-pipes for use of live steam in case of necessity. Proper valves shut off these steam-pipes when they are not required. I maintain only about one foot of fluid, and that weak ammonia, in the still. In the upper part of the still I place near together a large number of dripping-pans, which are metal plates, each provided with a raised rim, and punched with numerous holes, with a burr raised around each hole. The burrs and the rim cause the pans to retain a portion of the aqua-ammonia dropping upon them, and thus they expose a large evaporating-surface. The strong ammonia is pumped into the upper pans, and passing through the holes into the next one below, and so on down through all the pans, a large portion is evaporated. The remainder is caught in a pan just above the steam-coils in the upper part of the still, from which pan it is admitted to a coil similar in form and size to those used for steam-circulation. This coil is pierced on the upper side with numerous small holes, through which the ammonia escapes, and is evenly distributed upon the heated upper surface of the coil immediately beneath, and running over it drips upon the one below that, and so on down to the bottom. I fit the upper part of the trap with a coil, through which cold water circulates. I employ two absorbers. I elevate the first absorber thirty feet (more or less) above the level of the second absorber and the strong-ammonia receiver, thus gaining the suction due to the fall of the aqua-ammonia, and also effecting a pressure in the secondary absorber; and, further, in filling the inside of the first absorber with coils, (similar to those used in the still,) in which cold water circulates, and also with a distributing-coil. I introduce between the absorber and the still a regulator, which controls the outlet of the still, so as to always maintain an even height of weak ammonia in the still. The construction of this device will be more fully set forth in its proper place. I make the strong-ammonia receiver consist of three or more vessels connected by pipes, so as to force the outgoing air to pass through fluid in order to free it from ammonia, and provide the last vessel with a safety-valve, to allow any undue pressure of air to escape, without at the same time permitting loss of ammonia, and, further, place said receiver in a bath kept cool by circulating water or by other cooling agent.

I so construct and connect the anhydrous ammonia receiver that a trap is formed in the bottom, by which any water or aqua ammonia getting into the receiver may be separated at that point and the aqua-ammonia returned to the strong-ammonia receiver. The secondary absorber, as I construct it, consists of a coil of pipe immersed in the cooling-bath surrounding the strong-ammonia receiving-tanks. In the interchanger I inclose the two coils, which are to serve the purpose of exchanging the heat from the weak ammonia to the strong ammonia, in a vessel strong enough to withstand the pressure due to the heat of the weak ammonia when applied to water. In the secondary still I place in its upper part a series of perforated pans like those used in the principal still, and filling the lower half with a worm-coil for steam-circulation.

In the drawings which form a portion of this specification.

A is the body of the still—a cylindrical iron shell having a hemispherical top and bottom and an upper cylindrical portion, $A^2$. The lower part of the still is provided with a series of steam-coils, B, each connected to a manifold, C, for supplying exhaust-steam, and another manifold, $C^2$, for carrying it and the water of condensation off after it has done its work.

D $D^2$ are live-steam pipes, of which the application will be explained further on.

The upper part, $A^2$, of the still A has a large number of dripping-pans, E, placed quite near each other.

F is the secondary still, containing like dripping-plates and a steam-coil, $f$.

G is the ammonia-trap, provided with a water worm or coil, $g$, connected at or near the middle with the top of the still, and at the bottom with the bottom of the still, and at the top also with the condenser.

H is the tank containing the condensing-coil $h$, surrounded by the cooling-water, which is made to circulate by continual inflow and outflow.

I is the reservoir for the anhydrous ammonia; J, the tank containing the refrigerating-coils $j$.

K is the absorber, consisting of a cylindrical iron shell with hemispherical ends containing a series of coils, $k$, like those in the still, each independently connected to manifolds for cold-water circulation, and a sprinkler or distributer, $k^2$, which is exactly like the coils $k$, except that the upper surface is pierced with a large number of small holes.

L is the interchanger-tank, containing the spiral worm pipe-coils $l$ and $l^2$, placed so that the whirls of the two coils alternate. The coils are surrounded by water or other liquid for effecting the required exchange of heat.

M is an outer tank containing three smaller tanks, N $N^2$ $N^3$, which are strong-ammonia receivers, and are surrounded by brine kept cold by the circulation through pipe-coil O of the spent ammonia-gas from the refrigerating-coil. The coil O surrounds the three tanks N $N^2$ $N^3$, and has alternating with its whirls a coil, P, which acts as a secondary or auxiliary absorber.

R is the regulator, consisting of a closed boiler-plate shell provided with a horizontal extension, $r$, and containing a float, $r^2$, operating a double-seated valve, $r^3$, by means of a lever, $r^4$.

S is the pump which draws the strong ammonia from the receiver N and forces it to the top $A^2$ of the still A.

T is the pump which draws the chilled non-congealable liquid from the tank M and forces it to circulate through the coils $k$ by means of manifolds $k^3$. The glass liquid-gages are indicated by W.

The pipes are numbered in order as far as possible, and their uses and connections will be given in the description of the operation of the apparatus.

V, either with or without exponent number, indicates valves wherever it occurs on the drawings, and the arrows indicate the direction of the flow of liquids and gases through the pipes.

Figure 12:
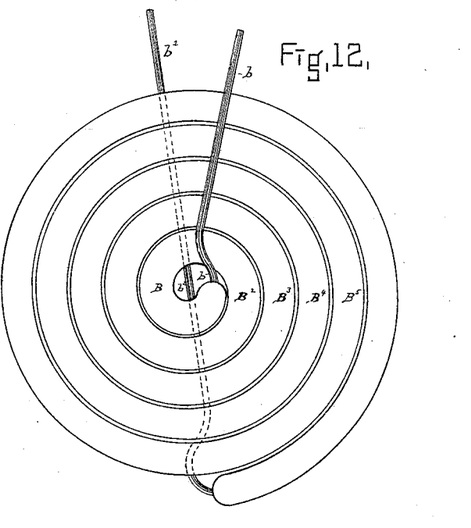
Fig. 12 is a plan view, on an enlarged scale, of one of the coils used in the still for steam, in the absorber for water-circulation, and in both at the top, when pierced with holes, as a distributer.
Figure 15:
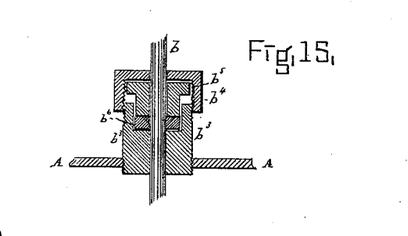
Fig. 15 is an axial section of one of the glands through which the small pipes connecting the steam-coils to the manifolds pass.

In the lower part of the still A are superposed, with slight interval between them, coils of pipe B, Fig. 12, formed of one continuous pipe bent into a close spiral, all of the whirls $B^2$ $B^3$ of which are nearly in one plane, or thereabout, and separated from each other by a space of an eighth of an inch, (more or less.) The ends are drawn down, and pieces of pipe, preferably of small diameter, $b$ $b^2$, are welded to them. One of these smaller pipes, $b$, is carried over the coil, and the other small pipe, $b^2$, under the coil. Both are brought out on preferably radial lines, and the upper pipe, $b$, is used to supply steam, the lower carrying off water of condensation and waste steam. These small pipes pass laterally out through stuffing-boxes in the shell of the still, and are composed of a pipe, $b^3$, having a screw-cap. $b^4$, a gland, $b^5$, and lead or soft-metal packing, $b^6$. In this manner a gas-tight joint is obtained, and one containing no fibrous material. This joint or packing is shown in Fig. 15. The pipe $b$ is connected to the manifold C, which supplies the exhaust-steam. $b^2$ is likewise connected to the waste-steam manifold $C^2$. A portion of these coils are also connected by means of the pipes $d$ $d^2$ with live-steam supply and waste manifolds D $D^2$. These pipes are all supplied with the necessary valves, V V, to shut off any coil in case of leakage, and the lower portion of the coils can be connected or disconnected at will with the live-steam manifold when its use is required.

The upper coil, $B^2$, which is precisely the same as the others, is not connected with the steam-pipe, but is supported just above the upper steam-coil. It is pierced on the upper side with a series of small holes, and the ends are connected with the bottom of a shallow pan, $B^3$, placed above, which catches the drip from the upper part of the still, and delivers it into the distributing-coil $B^2$. This coil $B^2$ corresponds by preference in its construction to the steam coils beneath. The aqua-ammonia drips from it upon the upper heated coil, and a portion of the ammonia is evaporated, the excess overflowing upon the next coil beneath, and so on down to the bottom of the still.

Only about one foot of weak ammonia is kept in the still. The evaporation takes place from the surface of the coils while the aqua-ammonia is passing in a thin film over the heated pipes, thus avoiding the fierce ebullition produced in rapid evaporation by the rising of the liberated ammonia-vapor through a large body of fluid, which frequently causes the still to boil over.

Figure 13:
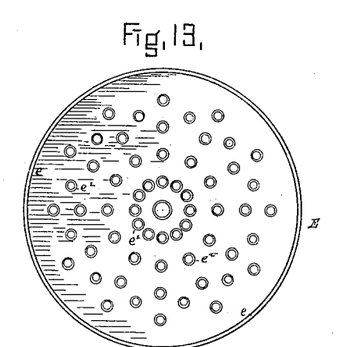
Fig. 13 is a plan view of one of the dripping-plates used in the upper part of the still.
Figure 14:
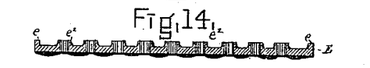
Fig. 14 is a vertical section of this pan.

The upper part, $A^2$, of the still contains a series of perforated dripping-pans, E, Figs. 13 and 14. A heavy burr, $e^2$, projecting about one-sixteenth of an inch, is raised around each hole, and there is a rim, $e$, around the outer edge of the pan of a corresponding height. A portion of the aqua-ammonia which is delivered upon the upper pan of the series, and, overflowing through the holes, drips in succession from one to the other, is retained in a thin layer in each pan, exposing a large evaporating-surface. The rising heated vapor from below impinges against the lower side of the lowest pan, and passing up through the perforations in the opposite direction to the descent of the aqua-ammonia meets it on its downward course, when an exchange of heat takes place, sufficiently lowering the temperature of the rising vapors to condense the vapor of water, and at the same time performing considerable service in liberating vapor of ammonia.

Figures 7, 8, 9, 10, 11:
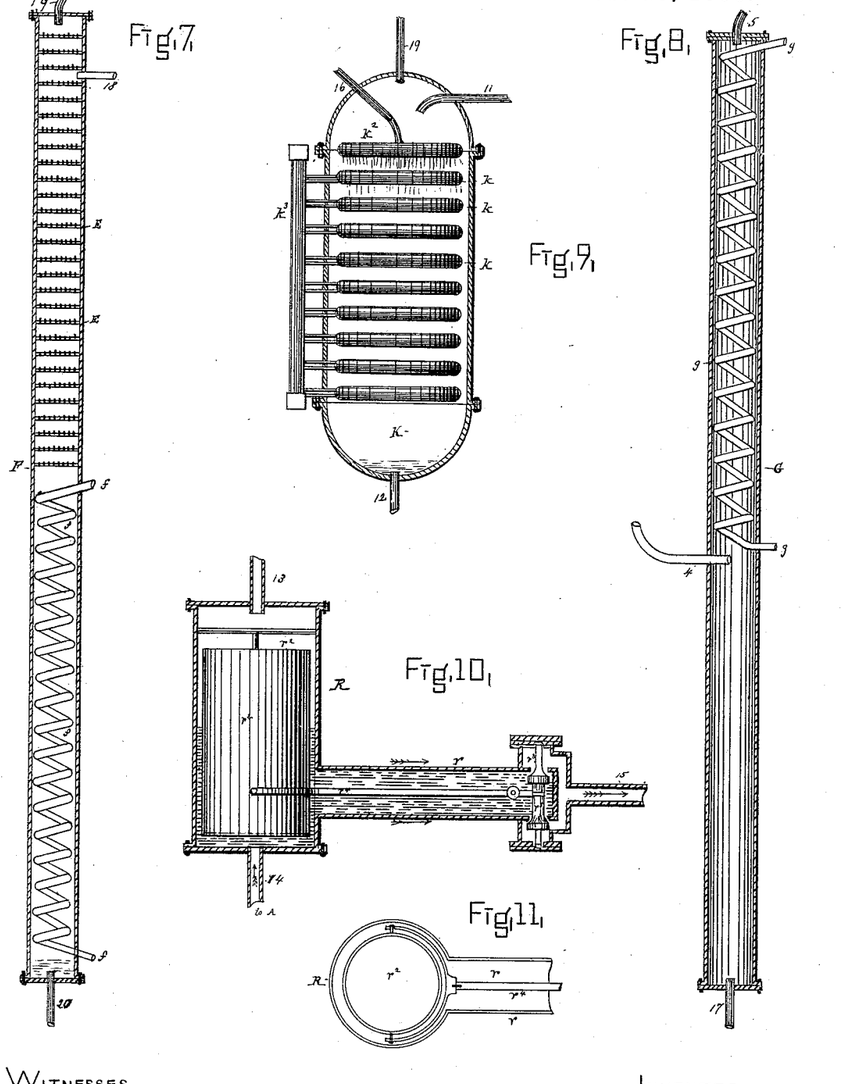
Fig. 7 is a vertical section of the secondary still.
Fig. 8 is a vertical section of the trap.
Fig. 9 is a vertical section of the absorber.
Fig. 10 is a vertical section of the regulator.
Fig. 11 is a horizontal section of the regulator.

The absorber K has a cylindrical body, which contains a series of coils, $k$, similar to those in the still, but having a cold-water circulation instead of steam, the cold water being supplied through one supply-manifold of pipe, and the water being permitted to escape from the coils through the other manifold or exit-pipes. The upper coil, which is a duplicate of the circulating-coils, is pierced with a series of small holes upon the upper side, and is connected with pipe 16, which delivers the weak ammonia. The ammonia-vapor is delivered to the absorber by the pipe 11. The perforations distribute the weak ammonia evenly over the upper water-circulating coil, and from that it drips down upon and runs over the cooled surface of all the coils beneath. The ammonia-vapor, being thus exposed—in the most advantageous manner possible for its absorption—to a large surface of weak ammonia, is rapidly absorbed, the weak ammonia becomes strong ammonia, and, passing out through perpendicular pipe 12, produces in its descent a suction due to the fall of the fluid, carrying with it bodily any portion of the vapor not yet absorbed by reason of the partial vacuum or temperature, or both, into the second absorber-coil, P, which is a continuation of pipe 12, where the remainder of the vapor is absorbed in consequence of the lower temperature and greater pressure; thence the strong ammonia passes to reservoir N.

Figure 4:
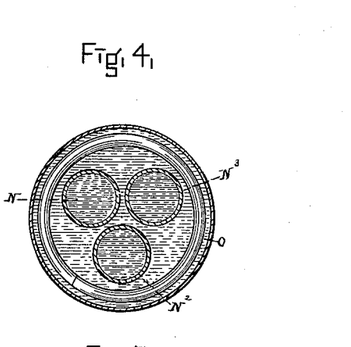
Fig. 4 is a horizontal section of the tank inclosing secondary absorbing-coil, cooling-coil, and tanks forming the strong-ammonia receiver.
Figure 5:
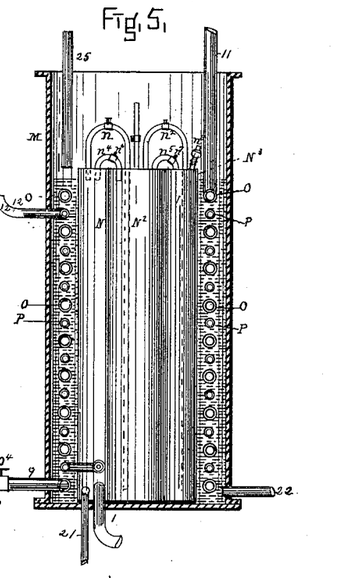
Fig. 5 is a vertical section of this same tank. The inner tanks, which form the strong-ammonia receiver, are shown in elevation.

Coil P is immersed in a bath, M, of a fluid non-congealable at the low temperature which it is desired to obtain fluid, in which there is another coil, O, the pipes of which are placed alternately over the pipes of the coil P. The coil O is connected with pipe 11 and provided with valves $o^2$ $o^3$, to connect and disconnect at will, so that when there is any available cold returning gas from cooling-coil $h$ to the absorber it can be utilized to cool the bath in which coil P is immersed to a still lower temperature. There is also a connection made from receiver I to coil O by pipe 8 and valves $o^4$ and $o^5$, to feed ammonia direct when there is no cold gas, or not enough returning through pipe 11.

The object to be attained by cooling the ammonia after it leaves the absorber K is to enable it to absorb the vapor that is carried from the absorber bodily by the suction due to the fall of the fluid down through pipe 12. The said suction producing a partial vacuum in absorber K, the weak ammonia will only absorb an amount of vapor due to the temperature and pressure therein, which is not enough to make aqua-ammonia of sufficient strength to enable exhaust-steam of 212° temperature to liquefy the vapor in condenser $h$ when the cooling-water is above about 55° temperature. With aqua-ammonia of commercial strength of 26° Baumé 212° heat will raise the pressure in the still to about one hundred pounds. With one hundred pounds pressure in the condenser and a temperature of 55°, the vapor will be condensed to a fluid, and freezing-work can be performed; but when the cooling-water is above 55° a higher pressure must be maintained, and either steam of higher temperature than 212° or stronger aqua-ammonia must be used; and in order to utilize exhaust-steam whenever water above 55° temperature must be used, I adopt the method of applying either a medium cooled artificially to the absorber, or applying pressure in it, or using some back-pressure on the exhaust-steam, or applying live steam to a portion of the coils in the lower part of the still A, or all of the alternatives at once, according to circumstances.

At a temperature of 50° and atmospheric pressure water will absorb six hundred and seventy volumes ammonia-vapor, and the resulting aqua-ammonia will have a specific gravity of .875, and at same temperature with a pressure of two atmospheres water will absorb about thirteen hundred volumes and have a specific gravity of about .825, (41° gravity Baumé,) and will boil at about 10° temperature at atmospheric pressure. At a pressure of one hundred and sixty pounds a temperature of 212° will evaporate it to about 26° gravity Baumé, thus giving with a temperature of 80° in the condenser a working margin of about 15° Baumé, or three hundred volumes.

In order to avoid carrying a high pressure in absorber K, (which indicates the pressure in freezing-coil $h$,) I place the absorber at an elevation of from thirty to one hundred feet, so that the fall of the fluid in pipe 12 will produce a suction in absorber K corresponding to a portion of the fall, and the balance of the vertical column will produce the pressure due to its height, thus obtaining both a suction in the absorber K and the freezing-coil $j$ and a pressure in absorber P, for the purpose mentioned, at slight cost, as the pressure upon the weak ammonia in the still will force it up the one hundred feet (more or less) without loss or detriment.

The pump T is connected by suction-pipe 22 with the bath in which coils O and P are located, for the purpose of forcing fluid from that bath into the circulating-coils in absorber K through pipe 23 whenever the water used for cooling purposes, which flows in through pipe 24, becomes too warm to accomplish the absorption. I thus consume a part of the cold produced; but this can be afforded as long as the whole is made by a waste product. When exhaust-steam cannot be had in sufficient quantity, and live steam must be used, it will be necessary to resort to artificial cooling of the absorber P, and I then circulate cold water through the coils in the bath M. The water flowing into cooling-coils of absorber K flows back to tank M through pipe 25.

The strong-ammonia receiver N is connected with another vessel, $N^2$, which is partly filled with weak ammonia, and that with another, $N^3$, filled in like manner, and that with another, if desirable, in such a manner that when there comes an overpressure in N, by reason of an accumulation of air or vapor, or from any cause whatever, the surplus will pass into $N^2$ through a pipe, $n$, which reaches nearly to the bottom of $N^2$, causing the air and vapor to pass up through the fluid in $N^2$, which fluid will absorb the vapor of ammonia and allow the air to pass on through pipe $n^2$ into the next receiver, $N^3$, and finally out through a safety-valve, $n^3$, that is set on the last receiver, $N^3$, at any pressure found desirable to maintain. Receivers N and $N^2$ and $N^3$ are also connected again by separate pipes, $n^4$ and $n^5$, each of which pipes has a check-valve, $n^6$ and $n^7$, set so as to keep anything from passing from N to $N^2$ and from $N^2$ to $N^3$ through them, but will open from $N^3$ to $N^2$ and from $N^2$ to N, in order to furnish receiver N with something to compensate for varying quantity of fluid in the same without getting it from the atmosphere direct. This procedure enables the machine to automatically purge itself of air without loss of ammonia. When the aqua-ammonia in receiver $N^2$ becomes so strong that it does not readily absorb more vapor, it is transferred into receiver N, and the contents of $N^3$ are transferred into $N^2$, and $N^3$ is refilled with water or other weaker ammonia. This transfer can be effected by means of a pump. The strong-ammonia receiver N and its accompanying receivers $N^2$ and $N^3$ are all placed within a bath, M, which contains coils O and P. The coil O cools bath M, which cools in turn coil P, the secondary absorber, $m$, and also the receivers N, $N^2$, and $N^3$.

In order to use live steam in connection with exhaust-steam for the purpose of utilizing exhaust-steam as far as it will go when a higher pressure than steam of 212° temperature will produce is required, I connect, by means of manifolds D and $D^2$, (see Figs. 1 and 6,) about one-third of the coils in the lower part of the still A with live steam in such a way that all the coils may use exhaust-steam; or, by shutting the valves V, V', and $V^2$ on all or any of the coils so connected, the exhaust-steam may be shut off, and by opening valves $V^3$ and $V^4$ live steam will be admitted to said coils. A steam-trap is connected with the outlet-manifold $C^2$, so as to allow the water of condensation to pass out and yet maintain the steam-pressure in the coils, thus obtaining a higher degree of heat in the said coils. Now, after the aqua-ammonia has passed over the coils in the still, which are heated by exhaust-steam, and after all the ammonia-vapor which that heat will drive off has been expelled, the aqua-ammonia next falls upon the coils heated to a higher temperature by the live steam, which will expel another portion of vapor, thereby raising the pressure in the still.

The receiver I, for anhydrous ammonia, is made preferably hemispherical at the bottom, and connects with pipes 10 and 11 by pipe 8.

A suitable valve, $V^5$, is placed so as to draw from the bottom. The glass gage $w$ reaches to the bottom of the cone, for the purpose of showing all the fluid contained in the said receiver. The outlet-pipe 4, for feeding anhydrous ammonia into the freezing-coils $j$, is placed a little higher up, so as to form a trap. Now, if any water gets into the receiver I, the fact can be noted by viewing the glass gage $w$; as aqua-ammonia is readily distinguished by sight from anhydrous ammonia, and the water or aqua-ammonia may be drawn off by opening valve $V^5$ into receiver N, and serious trouble arising from aqua-ammonia getting into the freezing or chilling pipes may be thus prevented. The trap G is connected with the still at bottom by pipe 17, and at about half its height by pipe 4, and has a coil, $g$, in the upper part, through which cold water circulates. The vapor-pipe 4 from the still enters the trap below the coil and delivers the vapor at that point. The outlet 5, for vapor, being at the top of trap G, the vapor must pass the cold-water-circulating coils, and will deposit thereon any vapor of water that may be mingled with the ammonia-vapor. This coil is shown in the drawings in the ordinary helical or worm-shape form; but it might also be of the same form as those in the still. The interchanger L is an inclosed strong vertical cylindrical vessel, inclosing within it two coils, and when filled with water constitutes a bath for transferring heat from one coil to the other. One of the coils intervenes between the bottom of the still A and the absorber K, and conveys the hot weak ammonia from the still, and in its passage through the immersed coil the hot ammonia imparts its heat to the bath. The other coil intervenes between the pump S and the top of the still $A^2$, and conveys the strong ammonia to the still, which in its passage through the coil immersed in the bath absorbs the heat imparted to the bath by the other coil.

Figures 2, 3, 6:
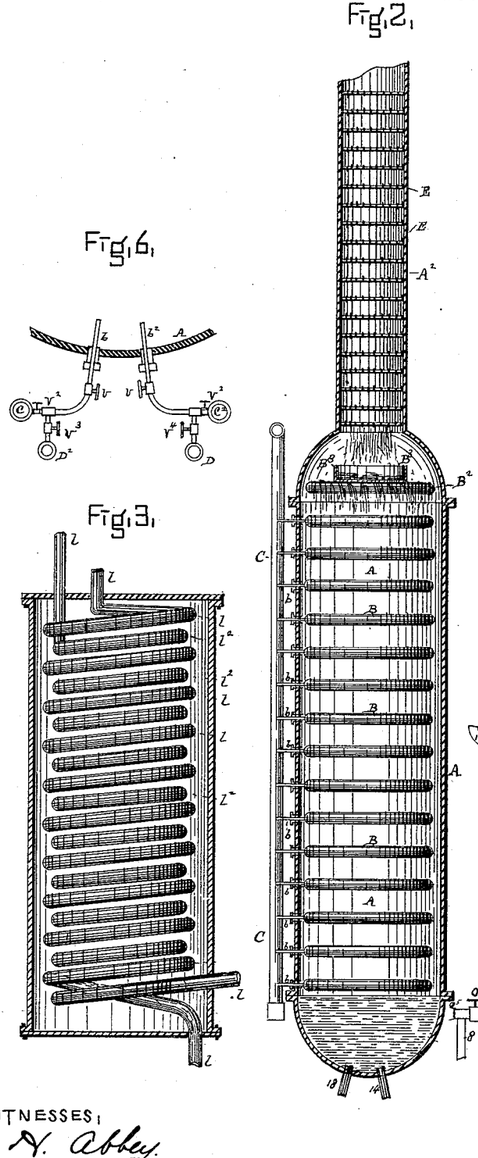
Fig. 2 is a vertical section of the ammonia-still. The steam-coils are shown in elevation.
Fig. 3 is a section of the interchanger, showing the two coils and the water bath. The whirls of these two coils alternate, and one spiral is of less diameter than the other to show this arrangement more clearly.
Fig. 6 is a plan view of the pipes and valves connecting the steam-coils of the still with the exhaust-steam and live-steam manifolds.

The object of inclosing the two coils in a strong close vessel is to hold in the bath all the heat imparted to it by the hot weak ammonia by maintaining whatever pressure is due to the heat applied.

When steam of seventy pounds pressure is used in the still, the weak ammonia passing out will have a temperature of about 270°, and if that temperature be applied to an open bath no higher heat than 212° will be obtained, while if the bath be inclosed all the heat will be retained, the bath be heated to 270°, and the strong ammonia heated accordingly before entering the still.

This interchanger may also consist of a single coil, through which one of the fluids circulates, placed in a tight vessel containing the other fluid instead of water. The aqua-ammonia will in this case act as the exchanging medium, and my apparatus includes either of said constructions and arrangements.

The regulator R is a vertical cylinder about three feet high, connected at the bottom by pipe 14 and at top by pipe 13 with the still, so that the fluid will maintain the same height in both vessels. The cylinder R contains within it a float, consisting of another cylinder, $r^2$, of smaller diameter than the exterior one, and shorter length, and open at the top. The float $r^2$ is connected with one end of a lever, $r^4$, which works over a fulcrum and connects with the double-seated valve $r^3$ in such a way that when the fluid in the cylinder R raises the float $r^2$ the valve $r^3$ is opened wider to allow more fluid to pass through, and when the fluid falls in the regulator R the float $r^2$, acting on the lever $r^4$, closes the valve $r^3$ correspondingly, and this will regulate the height of the fluid in the still within a few inches, whether there is a large or small quantity going into the still. The outlet for valve $r^3$ is connected with pipe 15, which conducts the fluid through interchanger L into absorber K.

F is weak-ammonia still, for the purpose of distilling off the ammonia left in the weak aqua-ammonia when the same is drawn from still $A^2$, for the purpose of adding fresh aqua-ammonia with which to replenish the stock of anhydrous ammonia. The still F is similar to still A, and works in the same manner, only without pressure, and thus we are enabled to distill off the remaining ammonia. Pipe 18 delivers the weak aqua-ammonia from still A into still F near the top, which passes down through the perforated plates and over the steam-coils in the lower part, and by the time it reaches the bottom the remaining ammonia is expelled, and the water is then blown out or drawn out. The vapor passes out through pipe 19 to the absorber K, and the exhausted liquid can be run off through pipe 20.

Figure 1:
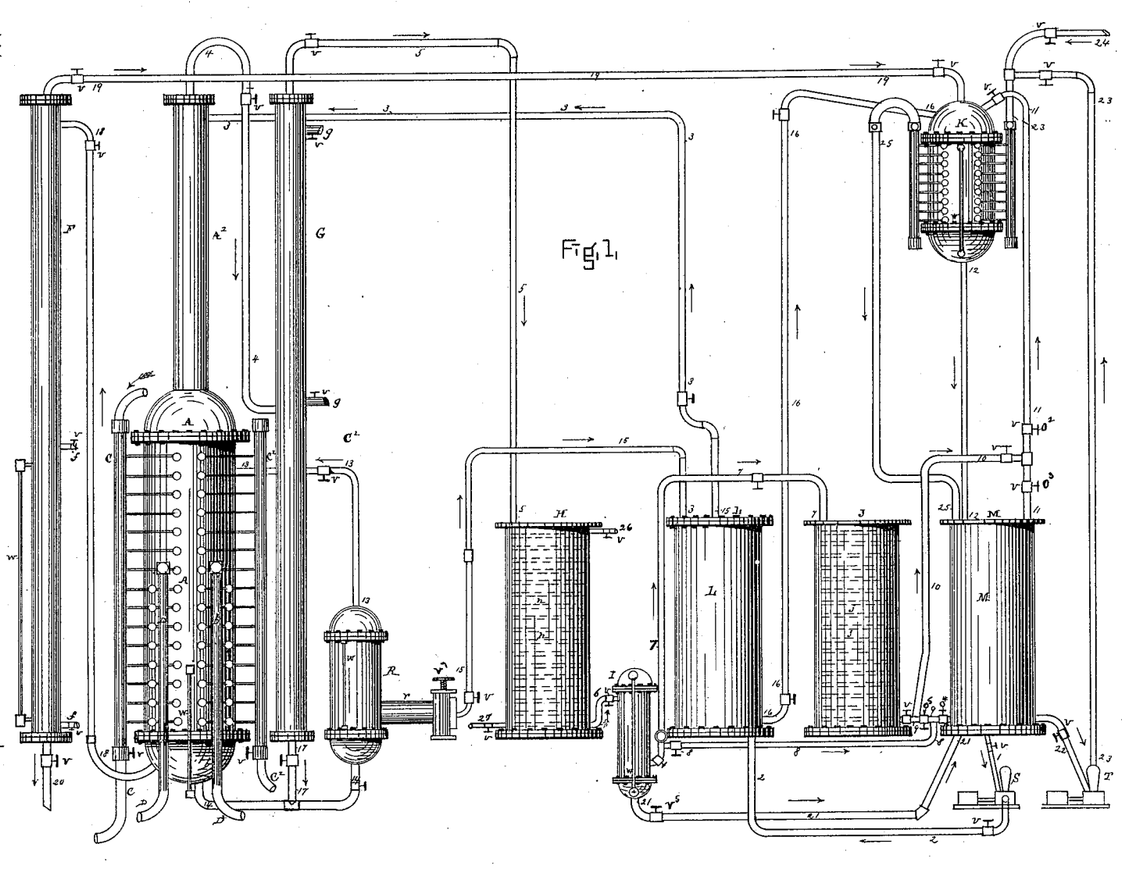
Figure 1 is a general view of the whole apparatus in vertical elevation, designed to show the relative positions of the various parts and the pipe-connections.

The operation is as follows: The pump S takes the strong ammonia from the receiver N through pipe 1, and forces it by pipe 2 through the interchanger L. The ammonia becomes heated, and is delivered by pipe 3 at the top $A^2$ of the still A upon the upper plate of the series, and passing through the perforated plates E is further heated by the hot ascending vapor from the body of the still A and a portion of its vapor liberated. The weakened ammonia resulting from this loss of vapor, after passing the last plate of the series of plates E at the bottom of the upper portion, $A^2$, of the still A, is caught by the pan in the top of the main still A and delivered into the distributing-coil $B^2$ above the steam-coils B B, and by it is equally distributed over the upper steam-coil, and by that upon the next coil beneath it, and so on to the bottom of the still A, by which time it has yielded up all the vapor due to the heat applied, and is ready to be returned to the absorber for renewal. For this purpose it passes through pipe 14 into the regulator R, where the float $r^2$ regulates the valve $r^3$, thence through pipe 15 to and through interchanger L, and by pipe 16 to the absorber K, thence down pipe 12 to absorber P, and from there into reservoir N, where it is ready for pump S to send it on its cycle again. The vapors from the still pass out through the pipe 4 into the trap G, where the water (if any comes over) and vapors separate. The water falls to the bottom of the trap and returns to the still by pipe 17. The vapor, rising, comes in contact with coil $g$, deposits upon it any aqueous vapor yet mingled with the ammonia-vapor, and this water of condensation also falls to the bottom of trap G, returning by pipe 17 to the still. From the top of the trap the ammonia-vapor passes through the pipe 5 to the coil $h$ in the condenser H. Around this coil $h$ cold water is made to circulate by pipes 26 and 27, and the ammonia-vapor is condensed by its own pressure to a liquid, which flows through pipe 6, and is collected in the reservoir or receiver I, from which it is fed by suitable valves in pipe 7 into the chilling-coil $j$, contained in the tank J, where it expands and absorbs heat from the surrounding air or liquid to be cooled. The expanded vapor rises from the coil $j$ by the pipes 10 and 11 into the elevated or primary absorber K, where it is absorbed by the weak ammonia, which, as has been before described, enters the absorber by the pipe 16. The resulting strong ammonia passes out down pipe 12 to the secondary absorber O, thence to reservoir N, from whence the pump S returns it again to the still. The pump T operates to circulate the non-congealable fluid drawn from the tank M through the coils $k$ of the elevated absorber K, from which it returns to the tank M by the pipe 25.

For the purpose of getting the full exchange of heat in interchanger L, and as an alternative, valve $r^7$ in the regulator is set open by screw $v^7$, and then regulated by valve on pipe 16, which causes the same pressure and temperature to be maintained in the coil $l$ in the interchanger as is in the still, and thus the strong ammonia entering the still is heated to about the same temperature as the weak ammonia emitted, and very little heat is lost.

Having now fully described my invention, what I claim, and desire to secure by Letters Patent, is—

1. The combination, substantially as before set forth, of the primary still with the secondary still by pipes, whereby the ammonia which has been treated in the primary still may be treated at a lower pressure in the secondary still.

2. The combination, substantially as before set forth, of a still provided with internal heating-pipes, and a distributer for distributing the liquid thereon, with a regulator, whereby the collected liquid is prevented from rising into contact with the heating-pipes.

3. The combination, substantially as before set forth, of the condenser for the gaseous ammonia with a reservoir (for the condensed ammonia) provided with two exit-pipes at different levels, whereby the aqua-ammonia may be drawn off separately from the anhydrous ammonia.

4. The combination, substantially as before set forth, of the absorber with a secondary absorber (arranged at a lower level than the absorber) and an ammonia-receiver by means of pipes, whereby the flow of ammonia from the absorber to the secondary absorber and ammonia-receiver is utilized, substantially as set forth.

5. The combination, substantially as before set forth, of the still-body with a series of internal superimposed coils and steam supply and waste manifolds.

6. The combination, substantially as before set forth, of the still-body with a series of internal superimposed coils and steam supply and waste manifolds, and a distributer for distributing liquid upon said coils.

7. The combination, substantially as before set forth, of the still-body with a series of internal superimposed coils, steam supply and waste manifolds, and valves in the connections between the said coils and said manifolds, whereby the said coils may be operated independently.

8. The combination, substantially as before set forth, of the still-body with a series of superimposed coils, two steam-supply manifolds, two waste-manifolds, and valves in the connections between said coils and said manifolds, whereby the said coils may be independently supplied with steam of different tensions.

9. The combination, substantially as before set forth, of the still-body, the internal coil having its supply and exit pipes extended through said body, and the stuffing-boxes fitted with soft-metal packings, through which said supply and exit pipes pass.

10. The combination, substantially as before set forth, of the lower still-section, provided with a series of internal superimposed coils, with an upper still-section provided with a series of superimposed drip-pans.

11. The combination, substantially as before set forth, of the lower still-section, provided with a series of superimposed coils, with an upper still-section which is provided with a series of superimposed drip-pans and communicates directly with said lower still-section, so that the liquid from said series of pans passes directly downward to said series of coils.

12. The spiral coil having supply and waste pipes extended laterally from the inner and outer ends of said coil beyond the periphery thereof, the whole being constructed without joints.

13. The combination, substantially as before set forth, of a still-body with a series of drip-pans constructed, as described, with series of holes, whereby the descending liquid and ascending gas pass in opposite directions through the same holes.

14. The combination, substantially as before set forth, of one absorber with the secondary still and with the primary still through intervening devices, whereby the same absorber operates to absorb the ammoniacal gas liberated in both stills.

15. The absorber constructed, substantially as before set forth, with an inlet-passage for the ammoniacal gas, an outlet-passage for the liquid ammonia, a distributer, and a series of superimposed coils which are connected with water supply and exit pipes.

16. The interchanger constructed substantially as before set forth, and consisting of a tank fitted with two independent internal coils whose whirls alternate.

17. The combination, substantially as before set forth, of the receiver for strong ammonia with the surrounding tank and with a coil of pipe arranged within said tank.

18. The combination, substantially as before set forth, of the receiver for strong ammonia with the surrounding tank, and with two independent coils of pipe arranged within said tank.

19. The combination, substantially as before set forth, of a primary absorber with a secondary absorber consisting of a tank fitted internally with a coil for the aqua-ammonia which is delivered from the said primary absorber.

20. The combination, substantially as before set forth, of the ammonia still with a trap which is separate from said still, and has its upper portion fitted internally with a coil for the circulation of water.

21. The combination, substantially as before set forth, of the absorber with the strong-ammonia receiver arranged at a distance below the said absorber, whereby the flow of ammonia from the said absorber to the said receiver is utilized, as before set forth.

22. A still provided with internal coil or coils of pipe for steam-circulation, so arranged within the still as not to be submerged in the liquid introduced therein, and that the liquid to be distilled shall be introduced above said coil or coils, so as to pass over and be brought in direct contact with the surfaces thereof, substantially as and for the purposes described.

In witness whereof I have hereunto set my hand.

ELI E. HENDRICK.

Witnesses:
CHAS. WILLIS,
WM. G. BUTTON.